Sept. 1, 1925.                                                1,552,224
T. E. MURRAY
MAKING OF COUPLINGS AND SIMILAR OBJECTS
Filed Oct. 24, 1921        3 Sheets-Sheet 1
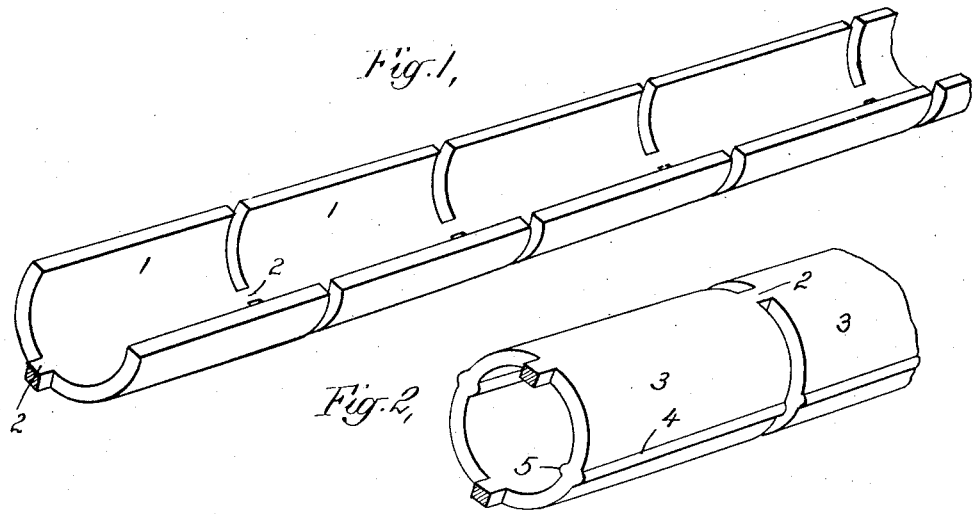
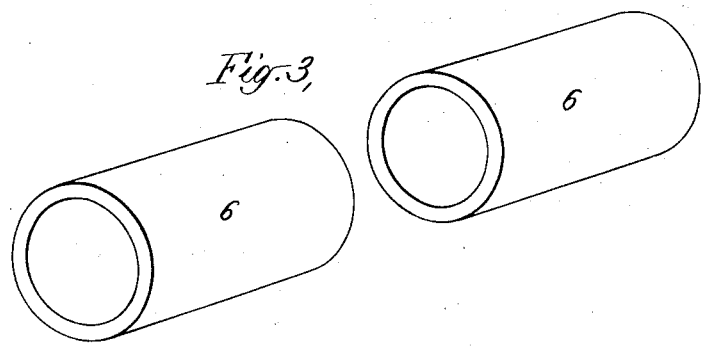
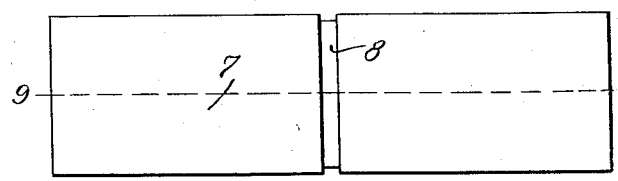
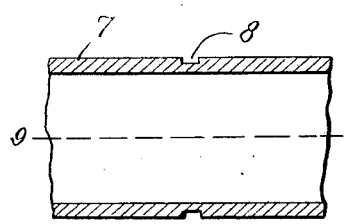
Inventor
Thomas E. Murray
By his Attorney
D. Anthony Usina Sept. 1, 1925.  1,552,224
T. E. MURRAY
MAKING OF COUPLINGS AND SIMILAR OBJECTS
Filed Oct. 24, 1921   3 Sheets-Sheet 2
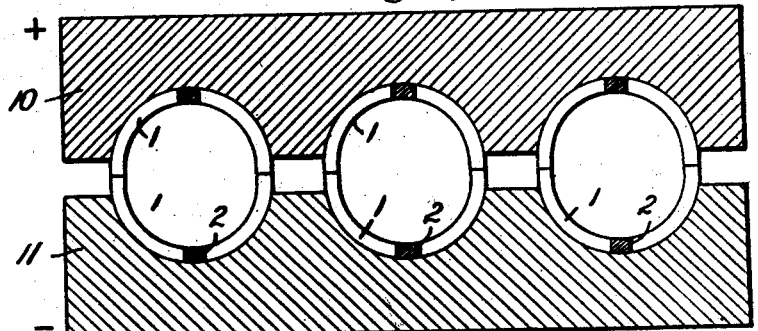
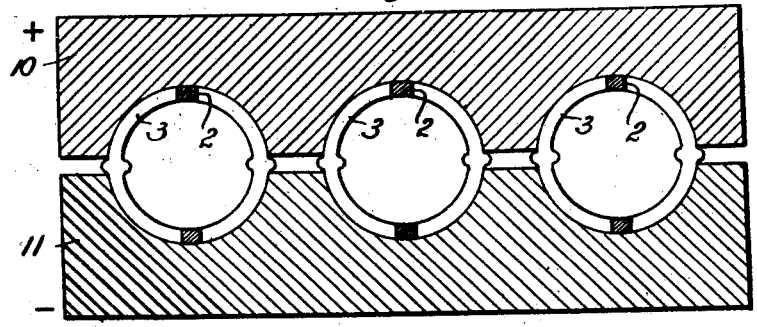
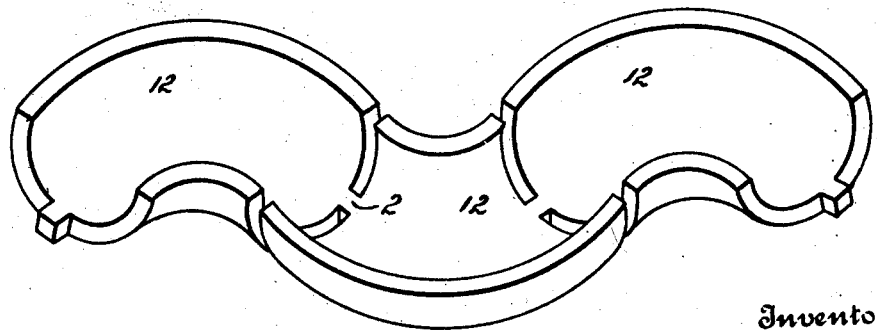
Inventor
Thomas E. Murray
By his Attorney Sept. 1, 1925.
T. E. MURRAY
1,552,224
MAKING OF COUPLINGS AND SIMILAR OBJECTS
Filed Oct. 24, 1921   3 Sheets-Sheet 3
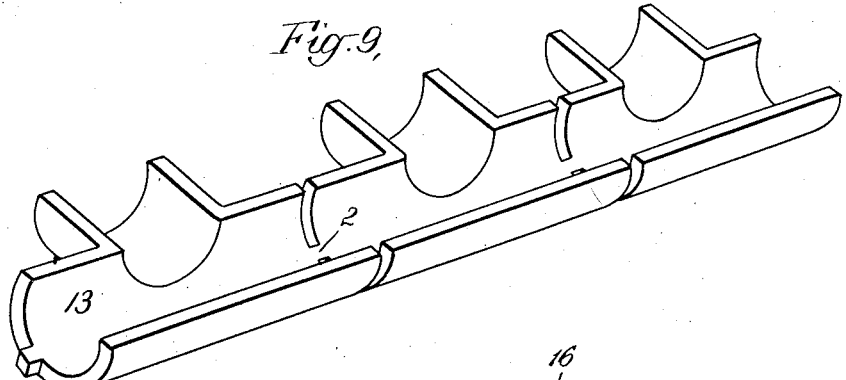
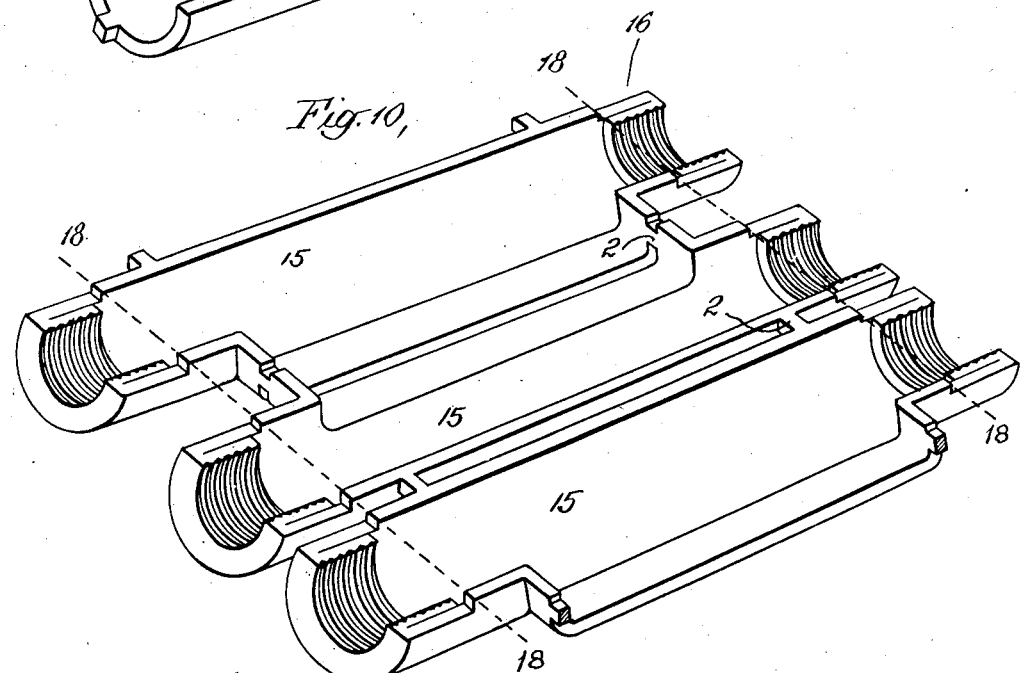
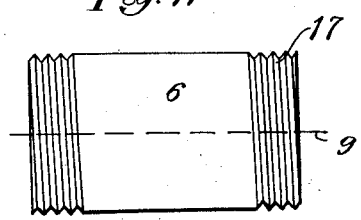
Inventor
Thomas E. Murray
By his Attorney Patented Sept. 1, 1925.

1,552,224

UNITED STATES PATENT OFFICE.

THOMAS E. MURRAY, OF BROOKLYN, NEW YORK.

MAKING OF COUPLINGS AND SIMILAR OBJECTS.

Application filed October 24, 1921. Serial No. 509,938.

*To all whom it may concern:*

Be it known that I, THOMAS E. MURRAY, citizen of the United States, residing in the city of Brooklyn, county of Kings, and State of New York, have invented certain new and useful Improvements in the Making of Couplings and Similar Objects, of which the following is a specification.

My invention aims to provide a method of producing couplings and the like rapidly and economically.

The accompanying drawings illustrate the use of the invention producing a variety of articles of this class.

Figs. 1, 2 and 3 are perspective views showing successive stages in the production of ordinary cylindrical couplings;

Figs. 4 and 5 illustrate a side elevation and section of an intermediate stage in an alternative method;

Figs. 6 and 7 illustrate in cross-section and in successive stages an extension of the method shown in Figs. 1 to 3;

Fig. 8 is a perspective view of a blank or intermediate product used in the production of elbows by my method;

Fig. 9 is a perspective of a blank used in the production of T's;

Fig. 10 is a perspective of a blank used in the production of condulets such as are used for carrying electric wires;

Fig. 11 is a perspective of a nipple form of coupling complete with threaded ends.

The invention is applicable to various other tubular products and is of particular value in producing at one operation a very considerable number of small articles of this class.

Segmental blanks are first produced from sheets of metal of the desired thickness by usual bending, cutting and stamping operations. Such a blank, for example, is illustrated in Fig. 1 and consists of a series of cylindrical segments 1 of uniform diameter in line with one another, spaced slightly apart from each other and connected together by spacers or portions 2 which are integral with the tubular portions, but of reduced cross-section, extending in fact along only a short portion of the ends of the members 1, just sufficient in fact to hold them together during the next operation.

Two of the blanks shown in Fig. 1 are brought together at their edges and welded at one operation into a product indicated in Fig. 2. We have thus a series of tubular members 3 united to each other by the reduced portions 2; and, assuming that the parts are forced together in the welding operation, with ribs or fins 4 and 5 formed by the metal extruded along the joint. By simple cutting or grinding operations the members 3 are separated by removal of the portions 2, after which the fins 4 are also removed, producing short tubes 6, Fig. 3, which are the products of this invention. These tubes are subsequently threaded, machined, or otherwise manipulated according to the style of coupling designed.

According to Figs. 4 and 5, the tubular parts 7 which are to constitute the finished product are united by portions 8 which, as shown in Fig. 5, are reduced in thickness. These reduced portions 8 serve the same purpose as the parts 2 of Fig. 1 and are to be removed after welding the segments together along the joints indicated by the dotted line 9. Various other schemes may be devised for connecting the parts together and properly spaced apart during the welding operation, and which are readily removable afterward.

I have assumed in the foregoing description that a single pair of blanks such as are shown in Fig. 1 are united to make a single line of couplings. A greatly increased output, and a consequent economy in production, may be effected by the method shown in Figs. 6 and 7; welding at one operation and with one pair of electrodes a plurality of pairs of segments like Fig. 1. For example, in Fig. 6 I show three such pairs of segments arranged laterally alongside of one another, the upper line of segments being engaged by an electrode 10 and the lower line by an opposite electrode 11. The segments rest in sockets or grooves in the opposed faces of the electrodes which are so spaced apart as to produce an even distribution of current to the three pairs of segments, and also to allow space between them for the burrs or fins which are extruded laterally when the current is turned on and the electrodes pressed together. The position at the end of the welding operation is shown in Fig. 7. It will be understood that in this operation each pair of segments is wholly separate from the other pairs, while in the operation described in connection with Fig. 1 each short tubular segment, while spaced apart from the next, is not entirely separated until after the welding operation.

The connections 2 between the segments, in Fig. 1 for example, serve also a useful purpose in permitting the distribution of current and tending to equalize the current between the segments which they connect.

When a plurality of articles is to be made by welding in the manner shown in Figs. 6 and 7 with the parts of one article spaced away from those of another, it is important that the spacing be such as to procure a substantially uniform distribution of current to the different articles when the welding current is passed and the parts are pressed together. This method of simultaneous welding may be applied not only to the manufacture of couplings, or of a series of couplings as illustrated, but also to the manufacture of various other separate articles either alike or different from one another, and either tubular or not.

Fig. 8 shows a blank which may be readily formed from a sheet and which comprises separate segments 12 of elbows united to each other by connecting portions 2, the same as in Fig. 1. Two segments of the sort shown in Fig. 8 are welded together and the separate elbows are then formed by removing the connecting portions 2 and the fins formed in the welding operation.

Fig. 9 shows a similar blank comprising a series of segments 13 of T's arranged end to end and united by reduced portions 2. Two blanks of this shape may be welded along their edges and the connections and any burrs produced in welding removed to produce a number of T's. Fig. 10 shows the same principle applied to the making of condulets. These are short sections of tubing with an elongated opening through one side. The segments 15 are connected by portions 2 of reduced cross-section which are to be removed after the welding of two such blanks together. This figure also illustrates certain optional modifications. The ends of the segments 15 are folded inward as at 16 to form a reinforcement at these points. And instead of arranging the segments 15 end to end as in the previous figures they are arranged side by side. The same principle, however, applies to utilizing temporary connections during the welding operation which space the segments apart from each other and which are readily removed afterwards.

My present method permits the use of sheet metal in the manufacture of couplings, elbows and the like with great economy and produces a seamless article at a low cost. The method may be used with segments of any fraction of a circumference. The series of segments, such as 1, in any blank may consist of any number of segments, two or more. In place of the integral connections shown between the segments for holding the parts together during the welding operation various other styles of readily breakable connections may be substituted.

The several articles shown are all couplings in a general sense, in that they serve to couple two pieces of tubing. It is to be understood that their ends are to be given any necessary shaping or threading for connection to said tubing, as in the plain screw threads shown at 17 on the ends of the nipple 6 of Fig. 11, made of two semi-circular segments welded together along edges whose original location is indicated by the line 9.

In some cases it is possible to stamp the thread in the half-couplings before the latter are welded. For example, in Fig. 10 the thickened portions 16 at the ends are stamped with threads, or it may be with other means of attachment of the adjoining tubes. These conduits do not have to be made watertight. For this reason the segments shown may be welded along only a sufficient portion of their length to ensure their being held together with the necessary strength. For example, only the portion between offsets along the dotted lines 18 may be welded. Such a method of uniting the segments facilitates the use of the stamped threads illustrated.

Therefore, though I have described with great particularity of detail certain specific embodiments of my invention, it is not to be understood therefrom that the invention is restricted to the particular embodiments disclosed. Various modifications may be made by those skilled in the art without departing from the invention as defined in the following claims.

What I claim is—

1. In the making of couplings and the like the method which consists in welding together blanks comprising a series of segments connected to one another by readily removable members, and removing said connecting members.

2. In the making of couplings and the like the method which consists in welding together blanks comprising a series of segments integrally connected to one another by portions of reduced cross-sectional area, and removing said connecting portions.

3. In the making of couplings or the like the method which consists in shaping blanks from sheets of metal, each blank comprising a series of segments integrally connected to one another by portions of reduced cross-sectional area, welding a plurality of said blanks together to form a similar series of tubular members, and removing said connecting portions.

4. In the making of couplings and the like the method which consists in welding together at one operation a plurality of pairs of segmental blanks, said pairs of blanks being arranged laterally alongside of one another with spacers between them, to form at one operation a corresponding plurality of tubular articles spaced apart from one another.

5. The method of welding which comprises placing together between a pair of electrodes the parts of a plurality of articles, with the parts of one article spaced apart from those of the other article or articles and at such distances as to procure a substantially uniform distribution of current to the different articles, and pressing said parts together while passing a welding current to unite the parts of each of the separate articles simultaneously.

6. In the making of couplings and the like the method which consists in welding together at one operation a plurality of pairs of segmental blanks, said pairs of blanks being arranged laterally alongside of one another, and each blank comprising a series of short segments in line with and connected to one another.

7. The method of making a plurality of cylindrical couplings of uniform diameter which consists in welding together segmental blanks consisting of a series of coupling segments in line with one another and connected to one another by reduced portions, and separating the couplings thus produced from one another.

8. The method of making couplings and the like which consists in forming segmental blanks with coupling means on their ends, and welding such segments together over only those portions of their length which are not provided with such coupling means.

9. A coupling composed of segments welded together along portions of their longitudinal edges and shaped for attachment to adjacent lengths of tubing, the portions thus shaped being beyond the welded joints.

In witness whereof, I have hereunto signed my name.

THOMAS E. MURRAY.